US012790516B2

(12) United States Patent
Hulteen et al.

(10) Patent No.: US 12,790,516 B2
(45) Date of Patent: Nov. 10, 2026

(54) METHOD OF USING AN ADHESIVE ARTICLE FOR GYPSUM BOARD CONSTRUCTION JOINT SYSTEMS

(71) Applicant: 3M INNOVATIVE PROPERTIES COMPANY, St. Paul, MN (US)

(72) Inventors: John C. Hulteen, Afton, MN (US); Paul A. Fannin, Minneapolis, MN (US); Richard J. Haffner, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 707 days.

(21) Appl. No.: 17/267,840

(22) PCT Filed: Oct. 9, 2019

(86) PCT No.: PCT/IB2019/058616

§ 371 (c)(1),
(2) Date: Feb. 11, 2021

(87) PCT Pub. No.: WO2020/079538

PCT Pub. Date: Apr. 23, 2020

(65) Prior Publication Data

US 2021/0309887 A1 Oct. 7, 2021

Related U.S. Application Data

(60) Provisional application No. 62/745,594, filed on Oct. 15, 2018.

(51) Int. Cl.
*C09J 5/00* (2006.01)
*C04B 28/14* (2006.01)
(Continued)

(52) U.S. Cl.
CPC ................ *C09J 5/00* (2013.01); *C04B 28/14* (2013.01); *C09J 7/243* (2018.01); *C09J 7/255* (2018.01);
(Continued)

(58) Field of Classification Search
CPC ..... C09J 5/00; C09J 7/243; C09J 7/255; C09J 7/385; C09J 7/387; C09J 2203/346;
(Continued)

(56) References Cited

U.S. PATENT DOCUMENTS 2,532,011 A 11/1950 Dahlquist
3,916,051 A 10/1975 Wakeman
(Continued)

FOREIGN PATENT DOCUMENTS

DE 10223688 12/2003
EP 0250248 12/1987
(Continued)

OTHER PUBLICATIONS

Kazimi et al., "A Short Review of Hydrophilic Surface Modification Methods for Low Density Polyethylene," International Conference On Chemical Innovation, 2011, pp. 203-206; p. 203, top of second column. (Year: 2011).*
(Continued)

*Primary Examiner* — Scott W Dodds
(74) *Attorney, Agent, or Firm* — Julie Lapos-Kuchar

(57) ABSTRACT

Described herein is a method of using an adhesive article on a gypsum board construction assembly. The gypsum board construction assembly has a first gypsum board unit and a second gypsum board unit defining a space therebetween, the method comprises obtaining the adhesive article, wherein the adhesive article comprises a first major surface and an opposing second major surface, wherein an adhesive is disposed on the first major surface and the opposing
(Continued)

second major surface has a surface free energy of at least 29 mN/m, and wherein the adhesive article has an adhesion to gypsum board of at least 45 oz/in (0.49 N/mm); and fixedly attaching the adhesive article via the adhesive to a first and second attachment areas, wherein the first gypsum board unit comprises an outer paper surface and the second gypsum board unit comprises an outer paper surface and the first attachment area is on the outer paper surface of the first gypsum board unit and the second attachment area is on the outer paper surface of the second gypsum board unit, and wherein the portion of the adhesive article disposed over the space is non-porous.

17 Claims, 2 Drawing Sheets

(51) Int. Cl.

| | |
|---|---|
| ***C09J 7/24*** | (2018.01) |
| ***C09J 7/25*** | (2018.01) |
| ***C09J 7/38*** | (2018.01) |
| ***E04B 1/94*** | (2006.01) |
| ***E04F 13/04*** | (2006.01) |
| ***E04F 21/165*** | (2006.01) |
| *C04B 111/00* | (2006.01) |
| *C04B 111/28* | (2006.01) |

(52) U.S. Cl.

CPC ............... *C09J 7/385* (2018.01); *C09J 7/387* (2018.01); *E04B 1/948* (2013.01); *E04F 13/042* (2013.01); *E04F 21/1652* (2013.01); *E04F 21/1657* (2013.01); *C04B 2111/0062* (2013.01); *C04B 2111/28* (2013.01); *C09J 2203/346* (2020.08); *C09J 2301/122* (2020.08); *C09J 2301/302* (2020.08); *C09J 2400/10* (2013.01); *C09J 2400/286* (2013.01); *C09J 2423/046* (2013.01); *C09J 2423/106* (2013.01); *C09J 2433/00* (2013.01); *C09J 2453/00* (2013.01); *C09J 2467/006* (2013.01)

(58) Field of Classification Search

CPC ............ C09J 2301/122; C09J 2301/302; C09J 2400/10; C09J 2400/286; C09J 2423/046; C09J 2423/106; C09J 2433/00; C09J 2453/00; C09J 2467/006; C09J 2204/346; C04B 28/14; C04B 2111/0062; C04B 2111/28; E04F 21/1652; E04F 21/1657; E04F 13/042; E04B 1/948

See application file for complete search history.

(56) References Cited

U.S. PATENT DOCUMENTS

| | | | | |
|---|---|---|---|---|
| 4,313,988 | A | 2/1982 | Koshar | |
| 4,329,384 | A | 5/1982 | Vesley | |
| 4,330,590 | A | 5/1982 | Vesley | |
| 4,482,687 | A | 11/1984 | Noshay | |
| 5,486,394 | A | 1/1996 | Stough | |
| 5,687,523 | A | 11/1997 | Stough | |
| 5,711,124 | A * | 1/1998 | Stough | E04F 13/042 428/354 |
| 5,974,750 | A | 11/1999 | Landin | |
| 6,226,946 | B1 | 5/2001 | Stough | |
| 7,836,652 | B2 | 11/2010 | Futterman | |
| 7,841,146 | B2 * | 11/2010 | Colucci | E04F 13/02 52/459 |
| 2005/0034389 | A1 | 2/2005 | Boot | |
| 2008/0251201 | A1 * | 10/2008 | Sikkel | C08J 5/121 156/330 |
| 2011/0113709 | A1 | 5/2011 | Pilz | |
| 2013/0087268 | A1 * | 4/2013 | Anderson | B32B 29/005 156/247 |
| 2013/0283715 | A1 | 10/2013 | Bennett | |
| 2014/0008086 | A1 | 1/2014 | Foerg | |
| 2017/0081562 | A1 * | 3/2017 | Rosenthal | C09J 7/38 |

FOREIGN PATENT DOCUMENTS

| | | |
|---|---|---|
| GB | 2472402 | 2/2011 |
| GB | 2522934 | 12/2016 |
| JP | 07-042271 | 2/1995 |
| WO | WO 1994-020055 | 9/1994 |
| WO | WO 2016-167937 | 10/2016 |
| WO | WO2016/167937 A1 * | 10/2016 |
| WO | WO 2016-167956 | 10/2016 |
| WO | WO 2018-118571 | 6/2018 |

OTHER PUBLICATIONS

"Glass-Fibre Data Book," Edition 1 compiled by Trevor F. Starr, Springer-Science+Business Media, B.V. 1993; ISPN 978-0-412-46280-1; pp. viii and 57. (Year: 1993).*

3M Technical Data Sheet for 3M Performance Reinforced Water Activated Tape 6147 published Sep. 2011. (Year: 2011).*

Brandrup, "Polymer Handbook 4th Edition", 1999, VI524-VI540.

Oertel, "Polyurethane Handbook", Table of Content (1985), 17 Pages.

Satas, "Handbook of Pressure Sensitive Adhesive Technology", (1989), 585-600.

Technical Information: "Fire Tape Application Insert", A Product of e-z Taping System, 2016, 2 pages.

UCAR, "Combined XPS and contact angle studies of ethylene vinyl acetate and polyvinyl acetate blends," Applied Surface Science, Sep. 2011, vol. 257, No. 22, pp. 9587-9594.

International Search Report for PCT International Application No. PCT/IB2019/058616, mailed on Jan. 3, 2020, 5 pages.

* cited by examiner

METHOD OF USING AN ADHESIVE ARTICLE FOR GYPSUM BOARD CONSTRUCTION JOINT SYSTEMS

CROSS REFERENCE TO RELATED APPLICATIONS

This application is a national stage filing under 35 U.S.C. 371 of PCT/IB2019/058616, filed Oct. 9, 2019, which claims the benefit of U.S. Application No. 62/745,594, filed Oct. 15, 2018, the disclosure of which is incorporated by reference in its/their entirety herein.

TECHNICAL FIELD

An adhesive article construction for use in covering gypsum board joints, which can form a firestop, is described along with a method of use.

BACKGROUND

Local building codes and national standard practices require that steps be taken in commercial and residential construction to slow the spread of fire through attics, crawlspaces, and other interior locations. One such step is the construction of fire walls from wood or metal trusses or stud walls. A fire wall is created by fastening flat modular units to the wood or metal studs. These units, known as fire-rated gypsum board, are abutted together and provide a barrier to flame and fire-fighting water. Because of the modular construction of the gypsum board, gaps or seams are presented between individual modules. Standard practices require that these gaps be covered to reduce the rate of flame and water penetration through the fire wall.

SUMMARY

There is a desire to identify alternative joint systems for treating static joints including seams between two pieces of gypsum board, which may allow advantages in ease of use, improved performance, and/or are more aesthetically pleasing. In one embodiment, these alternative joint systems must also be fire-resistant.

In one aspect, a method of using an adhesive article on a gypsum board construction assembly is described, the gypsum board construction assembly having a first gypsum board unit and a second gypsum board unit defining a space therebetween, the method comprising:

- obtaining the adhesive article, wherein the adhesive article comprises a first major surface and an opposing second major surface, wherein an adhesive is disposed on the first major surface and the opposing second major surface has a surface free energy of at least 29 mN/m, and wherein the adhesive article has an adhesion to gypsum board of at least 45 oz/in (0.49 N/mm); and
- fixedly attaching the adhesive article via the adhesive to a first and second attachment areas,
- wherein the first gypsum board unit comprises an outer paper surface and the second gypsum board unit comprises an outer paper surface and the first attachment area is on the outer paper surface of the first gypsum board unit and the second attachment area is on the outer paper surface of the second gypsum board unit, and wherein the portion of the adhesive article disposed over the space is non-porous.

The above summary is not intended to describe each embodiment. The details of one or more embodiments of the invention are also set forth in the description below. Other features, objects, and advantages will be apparent from the description and from the claims.

BRIEF DESCRIPTION OF THE DRAWINGS

The figures disclosed below are representative embodiments of the present disclosure and are not drawn to scale.

Shown in FIG. 1 is a schematic side-view representing the application of an adhesive article of the present disclosure applied to a seam between adjacent panels of gypsum board.

Figure 2:
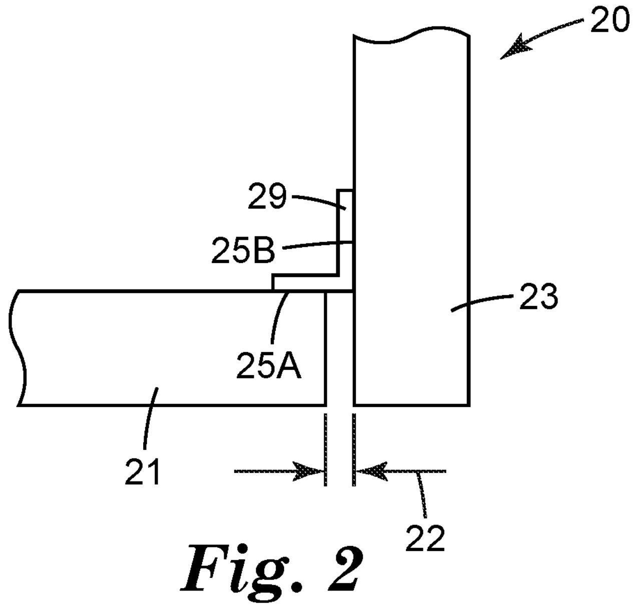

Shown in FIG. 2 is a schematic side-view representing the application of an adhesive article of the present disclosure applied to a seam between adjacent panels of gypsum board.

Figure 3:
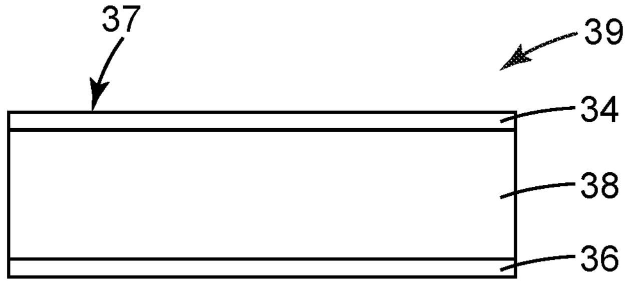

Shown in FIG. 3 is a schematic side-view of an adhesive article of the present disclosure.

Figure 4:
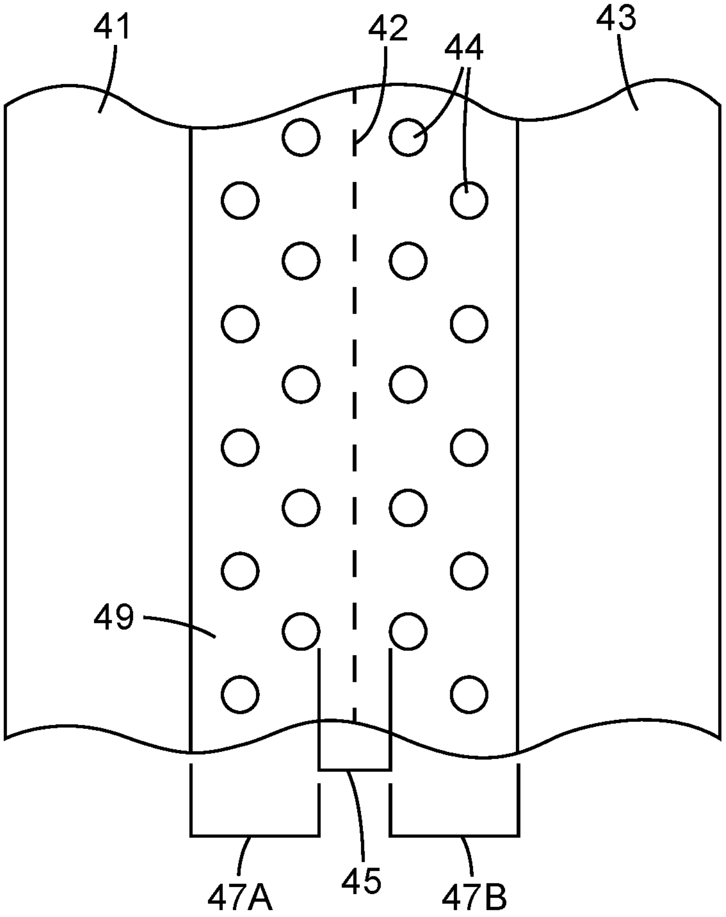

Shown in FIG. 4 is a schematic top-view representing the application of an adhesive article of the present disclosure applied to a seam between adjacent panels of gypsum board.

DETAILED DESCRIPTION

As used herein, the term

- "a", "an", and "the" are used interchangeably and mean one or more; and
- "and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

As used herein, "comprises at least one of" A, B, and C refers to element A by itself, element B by itself, element C by itself, A and B, A and C, B and C, and a combination of all three.

The present disclosure is directed toward the treatment of openings within buildings to contain and/or slow the spread of fire. Specifically, in commercial buildings (such as apartment buildings, office buildings, stores, etc.), there is a need to contain and/or slow the spread of fire. Thus, construction materials are tested and rated for their performance under fire conditions and federal, state and local authorities set building standards, including the types of materials to use, based on the structure to be built.

In one embodiment, a fire wall is created by attaching gypsum board panels to wood or metal studs. Gypsum board, as used herein, refers to a material comprising a stiff interior chalk-like material enclosed between paper. The interior material comprises calcium sulfate dihydrate (or gypsum) and optionally other additives such as fibers, plasticizers, and other compounds to decrease mildew, lower water absorption, and/or increase fire resistance. Gypsum board is also known as drywall, plasterboard, wallboard, or sheetrock.

Gypsum board frequently is used in construction applications to build walls between studs. Gypsum board panels have a given fire rating. Typically, these panels are commercially available in a limited assortment of sizes of fixed dimensions, such as four by eight feet. Thus, panels are abutted next to one another in order to form a surface (e.g., a wall) of greater dimensions. Where the panels abut one another, they form a static seam, which in the case of a fire, can compromise the fire rating of the wall made from gypsum board panels. Thus, it can be important to cover these seams to maintain the fire rating of the original gypsum board panel.

Figure 1:
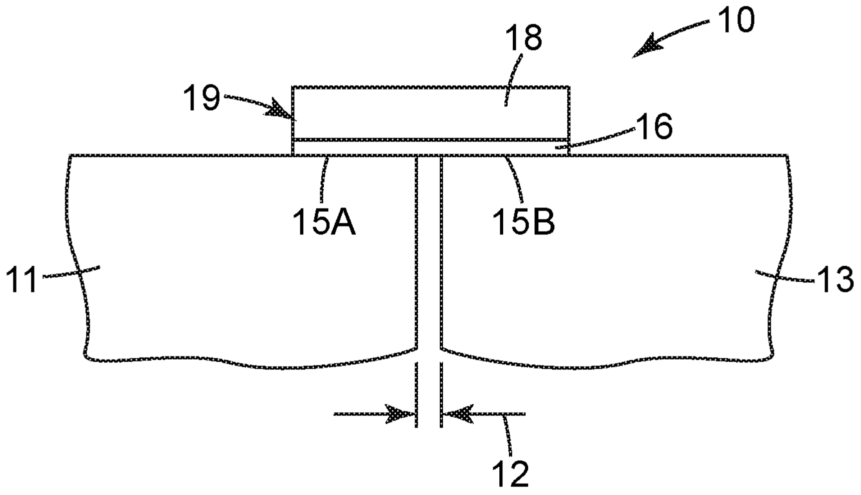

FIG. 1 depicts an exemplary configuration of a static joint system of the present disclosure between two panels (or units) of gypsum board: first gypsum board unit (11) and second gypsum board unit (13) having a space (i.e., opening) 12 therebetween. Adhesive article 19 is applied over space 12, wherein the adhesive article is fixedly attached via adhesive 16 to first attachment area 15A (for example on the paper of the gypsum board) and second attachment area 15B located on the major surfaces of the gypsum board units.

Shown in FIG. 1 is an opening between two parallel gypsum board panels (e.g., across a wall or ceiling), however, the opening can also occur between gypsum board panels that are approximately at a ninety-degree angle with respect to one another, such as a corner or a where a wall meets a ceiling as shown in FIG. 2. In one embodiment, the adhesive article of the present disclosure is fixedly attached to the paper on a major surface of the gypsum board and the paper on a major surface of a second piece of gypsum board.

In FIG. 2, first panel (21) and second panel (23) are perpendicular to one another, having space 22 therebetween. Adhesive article (29) is applied over space 22, wherein the adhesive article is fixedly attached via adhesive to first attachment area 25A and second attachment area 25B located on the major surfaces of the gypsum board panels.

The openings between the gypsum board panels of the present disclosure are static meaning that the panels are not capable of moving independently of one another and the width (and length) of the opening does not substantially change (e.g., move less than 1% of its original width) over time. In one embodiment, the width of the opening is at most 0.10, 0.11, or even 0.125 inches (2.5, 2.8, or even 3.2 mm).

Because of the nominal width, the space between the adjacent gypsum board panels is not packed with a material, for example, with a high-temperature resistant material (e.g., a material being thermally stable up to a temperature of at least about 150° C., 200° C., 300° C., 400° C., or even 500° C.). Exemplary high-temperature resistant materials include ceramic fiber, glass fiber, mineral fiber (also known as mineral wool, basalt, or rock wool), intumescent and endothermic packing materials, and combinations thereof.

An exemplary article of the present disclosure is depicted in FIG. 3. Adhesive article 39 comprises substrate 38 with adhesive layer 36 positioned on a first major surface of the adhesive article. In one embodiment, the adhesive article of the present disclosure is a 2-layer article consisting of the adhesive layer and the substrate. In another embodiment, the adhesive article comprises additional layers, such as optional coating layer 34 shown in FIG. 3. Adhesive article 39 comprises first major surface (not shown) upon which adhesive is disposed and an opposing second major surface (37).

The substrate of the adhesive article of the present disclosure may be selected from a polymeric film, a nonwoven matrix, a woven matrix, a foam, and combinations thereof. Exemplary substrates include polyolefins such as polyethylene, polypropylene (including isotactic polypropylene), polystyrene, polyester (such as poly(ethylene terephthalate) and poly(butylene terephthalate)), polyamide (such as aliphatic polyamides and aromatic polyamides), polyimide (such as aliphatic polyimides, semi-aromatic polyimides, and aromatic polyimides), polyvinyl alcohol, poly(caprolactam), poly(vinylidene fluoride), polylactides, cellulose acetate, ethyl cellulose, and the like. Commercially available backing materials useful include Kraft paper (available from Monadnock Paper, Inc.); cellophane (available from Flexel Corp.); spun-bond poly(ethylene) and poly(propylene), available under the trade designation "TYVEK" and "TYPAR" (available from DuPont, Inc.); and films obtained from poly(ethylene) and poly(propylene), available under the trade designation "TESLIN" (available from PPG Industries, Inc.), and "CELLGUARD" (available from Hoechst-Celanese).

In one embodiment, the substrate of the present disclosure is not a paper.

The substrate can be selected based on the application. The substrate should be stable (i.e., does not auto-ignite or distort) at temperatures of at least 80° C., 85° C., 90° C., 93° C., 95° C., 98° C., 100° C., 150° C., 180° C., 200° C., or even 250° C. In one embodiment, the substrate has some flexibility allowing the adhesive article to absorb the pressure experienced from a fire hose. In one embodiment, a polyolefin substrate is selected due to its resistance to humidity changes.

The portion of the adhesive article which directly overlaps the seam is non-porous. It is believed that the non-porosity of the adhesive article over the seam is important for sealing of the opening between the gypsum boards, preventing air and gas passage. The Gurley second or Gurley unit is a unit describing the number of seconds required for 100 cubic centimeters (1 deciliter) of air to pass through 1.0 square inch of a given material at a pressure differential of 4.88 inches of water. The lower the Gurely second, the more porous the material. The non-porosity may originate from the substrate itself or may be a result of additional layers, such as adhesive, applied to the substrate. In one embodiment, the substrate and/or the adhesive article has a Gurely value of greater than 5, 10, 20, 40, or even 60 Gurley seconds.

The adhesive article of the present disclosure may comprise perforations (or through holes), which may enable expediated drying of sheetrock mud. Such an adhesive article can be understood with respect to FIG. 4, which shows a top-view of adhesive article 49 applied to seam 42 between adjacent panels of gypsum board, 41 and 43. The first major surface of adhesive article 49 comprises central portion 45 and opposing distal portions 47A and 47B. Adhesive article 49 is perforated in distal portions 47A and 47B as shown by holes 44. Central portion 45 is non-porous and not perforated.

As mentioned above, the substrate comprises a central portion and at least two opposing distal portions. The central portion of the adhesive article is non-porous, meaning that it does not allow for convective flow of gas or smoke. In one embodiment, the entire adhesive article is non-porous, meaning both the central portion and the distal portions are non-porous. In another embodiment, the distal portion of the adhesive article is perforated (or comprises holes). These perforations may be of any shape (rhombus, triangular, circular, irregular, etc.). Typically, these perforations have an area of at least 0.05, 0.1, 0.2, 0.4, 0.6, or even 0.8 $mm^2$. The perforations may be large, including perforations having an open dimension across the width of the adhesive article which is slightly less than the width of distal portions 47A or 47B. In one embodiment, the distal portion of the substrate has a % open area of at least 1, 5, 10, 20, or even 30% and no more than 50, 60, 70, 80, or even 90%.

The non-porous central portion of the adhesive article should cover the seam between the abutting gypsum board panels. In one embodiment, the central portion is at least 0.25, 0.5, 1, or even 2 inches (6.4, 12.7, or even 25.4 mm) in width.

In one embodiment, the perforations are patterned, random or a pseudo random pattern. In one embodiment, the pattern of perforations is periodic (i.e., not random and having an order to it). The unit repeat, i.e., the area consuming the repeat pattern may have a triangular, quadrilateral (e.g., square, rhombus, rectangle, parallelogram), hexagonal, or other repeat pattern shape, which may be symmetric or asymmetric in nature.

Preferably, the central portion of the substrate's major surface is centrally located along the axis of the adhesive article as shown in FIG. 1B, with adhesive layers located on either side of the central portion. The adhesive layers are used to affix the adhesive article to the structural element(s). In some embodiments, the central portion may not be centrally located, however, a sufficient amount of adhesive layer must be present of either side of the central portion to affix the adhesive article to the gypsum board.

The adhesive disposed on the first major surface of the adhesive article is used to attach the article to the gypsum board construction assembly. Peel adhesion is related to the bonding strength between two materials. In one embodiment of the present disclosure, the adhesive article has a peel adhesion between the adhesive and the gypsum board of at least 45, 50, or even 55 oz/in (0.49, 0.55, or even 0.60 N/mm) and/or even the removal of the paper from the gypsum board during the test. High peel adhesion of the adhesive article to the gypsum board may be correlated to the ability of the adhesive article to remain adhered to the gypsum board construction assembly over the lifetime, or substantial lifetime, of the gypsum board construction assembly. For example, at least 5, 10, 15, 20, 30, 40, even 50 years. Peel adhesion can be measured according to ASTM D333/D3330M-04 (2010), Test Method F. In one embodiment the adhesive article of the present disclosure is not repositionable and/or removable, meaning that upon removal of the adhesive article from the gypsum board construction, at least some paper from the gypsum board is removed with the removal of the adhesive article.

The adhesive layer is disposed on the substrate as exemplified in FIGS. 1 and 2. Other layers as known in the adhesive art may be present, such as a primer layer located between the substrate and the adhesive. The adhesive layer may be continuous or discontinuous across the surface of the substrate.

Adhesive materials useful in the present disclosure include those that have sufficient adhesion to gypsum board. Adhesive materials suitable for the practice of the present disclosure include polymers of silicones, acrylics, alpha olefins, ethylene/vinyl acetate, urethanes, and natural or synthetic rubbers. In one embodiment, the adhesive is a pressure sensitive adhesive (PAS). In one embodiment, the pressure sensitive adhesive article can be applied to the gypsum board with hand pressure (e.g., a 4.5 pound (2 kg) rubber coated roller as described in ASTM D330M-04 (2010)).

Suitable urethane resins include polymers made from the reaction product of a compound containing at least two isocyanate groups (—N═C═O), referred to herein as "isocyanates", and a compound containing at least two active-hydrogen containing groups. Examples of active-hydrogen containing groups include primary alcohols, secondary alcohols, phenols, and water. A wide variety of isocyanate-terminated materials and appropriate co-reactants are well known, and many are commercially available for example, polyurethane dispersion-based PSA's from Dow Chemical Co. Also see, for example, Gunter Oertel, "Polyurethane Handbook", Hanser Publishers, Munich (1985).

In one embodiment, active-hydrogen compounds containing primary and secondary amines can react with an isocyanate to form a urea linkage, thereby forming a polyurea.

Suitable acrylic resins include acrylic pressure sensitive adhesives (PSAs). Acrylic PSAs comprise polymers of one or more (meth)acrylate ester monomers, which are monomeric (meth)acrylic esters of a non-tertiary alcohol, wherein the alcohol contains from 1 to 20 carbon atoms and preferably an average of from 4 to 14 carbon atoms.

Examples of monomers suitable for use as the (meth) acrylate ester monomer include the esters derived from either acrylic acid or methacrylic acid and non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 3,7-dimethylheptanol, 1-decanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof. In one embodiment, the (meth)acrylate ester monomer is present in an amount of 80 to 99 parts by weight based on 100 parts total monomer content used to prepare the polymer. Preferably (meth) acrylate ester monomer is present in an amount of 90 to 95 parts by weight based on 100 parts total monomer content.

The (meth)acrylic polymer further comprises a polar comonomer. For example, an acid group-containing comonomer. Examples of suitable acid-group containing monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl(meth)acrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. In one embodiment, the acid functional monomer is generally used in amounts of 0 to 10 parts by weight, preferably 1 to 5 parts by weight, based on 100 parts by weight total monomer.

Other polar monomers may also be polymerized with (meth)acrylate ester monomer to form the polymer. Representative examples of other suitable polar monomers include, but are not limited to, 2-hydroxyethyl (meth)acrylate; N-vinylpyrrolidone; N-vinylcaprolactam; acrylamide; mono- or di-N-alkyl substituted acrylamides, such as for example t-butyl acrylamide, dimethylaminoethyl acrylamide, and N-octyl acrylamide; poly(alkoxyalkyl) (meth)acrylates including 2-(2-ethoxyethoxy)ethyl(meth)acrylate, 2-ethoxyethyl(meth)acrylate, 2-methoxyethoxyethyl(meth) acrylate, 2-methoxyethyl methacrylate, polyethylene glycol mono(meth)acrylates and mixtures thereof. Exemplary polar monomers include those selected from the group consisting of 2-hydroxyethyl (meth)acrylate and N-vinylpyrrolidone.

In one embodiment, the other polar monomer may be present in amounts of 0 to 10 parts by weight, preferably 1 to 5 parts by weight, based on 100 parts by weight total monomer.

When used, vinyl monomers useful in the (meth)acrylate polymer include: alkyl vinyl ethers (e.g., vinyl methyl ether); vinyl esters (e.g., vinyl acetate and vinyl propionate), styrene, substituted styrene (e.g., α-methyl styrene), vinyl halide, and mixtures thereof. Such vinyl monomers are generally used at 0 to 5 parts by weight, preferably 1 to 5 parts by weight, based on 100 parts by weight total monomer.

In order to increase cohesive strength and improve the performance at elevated temperatures of the adhesive article, a multifunctional (meth)acrylate (comprising more than more acrylate group) may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth) acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth) acrylate is tailored depending upon application of the adhesive composition. Typically, the multifunctional (meth)acrylate is present in amounts less than 5 parts based on based on 100 parts by weight total monomer. In one embodiment, the multifunctional (meth)acrylate may be present in amounts from 0.01 parts to 1 part based on 100 parts total monomers of the adhesive composition.

Optional co-monomers can be used to tailor the performance of the adhesive. Optional co-monomers include those having at least two different reactive groups e.g., 2-OH (meth)acrylate and glycidyl (meth)acrylate.

In one embodiment, the (meth)acrylic polymer can be crosslinked with thermal cross-linking agents, which are activated by heat, and/or photosensitive crosslinking agents, which are activated by ultraviolet (UV) light. Useful photosensitive cross-linking agents include:

multifunctional (meth)acrylates, triazines, and combinations thereof. Exemplary crosslinking agents include substituted triazines such as 2,4,-bis(trichloromethyl)-6-(4-methoxy phenyl)-s-triazine, 2,4-bis(trichloromethyl)-6-(3,4-dimethoxyphenyl)-s-triazine, and the chromophore-substituted halo-s-triazines disclosed in U.S. Pat. Nos. 4,329,384 and 4,330,590 (Vesley). Various other crosslinking agents with different molecular weights between (meth) acrylate functionality may also be useful.

In one embodiment, glycidyl (meth)acrylate may be used as a thermal crosslinking agent to provide functionality which can be activated upon or after application in the field. For example, when the adhesive article is exposed to an elevated temperature, (e.g., a fire) the epoxy group of the glycidyl (meth)acrylate may react to provide further cross-linking, which can further increase the cohesive strength and increase the temperature resistance.

Suitable silicone resins include moisture-cured silicones, condensation-cured silicones, and addition-cured silicones, such as hydroxyl-terminated silicones, silicone rubber, and fluoro-silicone. Examples of suitable commercially available silicone pressure sensitive adhesive (PSA) compositions comprising silicone resin include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), PSA 529, PSA 750-D1, PSA 825-D1, and PSA 800-C. An example of two-part silicone resin commercially available is that sold under the trade designation "SILASTIC J" from Dow Chemical Company, Midland, MI.

Pressure sensitive adhesives (PSAs) can include natural or synthetic rubbers such as styrene block copolymers (styrene-butadiene; styrene-isoprene; styrene-ethylene/butylene block copolymers); nitrile rubbers, synthetic polyisoprene, ethylene-propylene rubber, ethylene-propylene-diene monomer rubber (EPDM), polybutadiene, polyisobutylene, butyl rubber, styrene-butadiene random copolymers, and combinations thereof.

Additional pressure sensitive adhesive include poly(alpha-olefins), polychloroprene, and silicone elastomers. In some embodiments, polychloroprene and silicone elastomers may be preferred since polychloroprene contains a halogen, which can contribute towards flame resistance, and silicone elastomers are resistant to thermal degradation.

In one embodiment, the pressure sensitive adhesives may also contain one or more conventional additives. Preferred additives include tackifiers, plasticizers, foaming agents, dyes, antioxidants, and UV stabilizers.

In some embodiments, a tackifying agent may be required to provide the desired adhesive characteristics. Styrene block copolymers or (meth)acrylic polymers may include a suitable tackifying resin. Suitable tackifiers include rosin acids, rosin esters, terpene phenolic resins, hydrocarbon resins, and cumarone indene resins. The type and amount of tackifier can affect properties such as tack, bond strength, heat resistance, and specific adhesion. Exemplary tackifiers include: hydrogenated hydrocarbons available under the trade brands "REGALITE" and "REGALREZ", by Eastman Chemical Co., Middelburg, Netherlands; and "ARKON" by Arakawa Chemical Inc., Chicago, IL; glycerin rosin ester available under the trade designation "FORAL 85" from Eastman Chemical Co., Kingsport, TN; hydrocarbon or rosin types are available under the series "ESCOREZ" from ExxonMobil Chemical, Houston, TX; hydrocarbon resins available under the series trade designation "WINGTACK" from Cray Valley, Exton, PA; and terpene phenolic tackifiers available under the trade designation "SYLVARES TP96" from Arizona Chemical, Jacksonville, FL.

In one embodiment, the pressure sensitive adhesive may contain a plasticizer, which can help soften the adhesive, and as a result, the structural element is more easily wetted by the adhesive. Further, the use of a plasticizer may improve the adhesive properties, including peel. The plasticizer may be hydrophobic and/or hydrophobic.

In one embodiment, the pressure sensitive adhesive is selected from at least one of an acrylic copolymer and a tackified styrene block copolymer.

The adhesive is applied at a thickness sufficient to adhere the adhesive article to the gypsum board. The thickness of the adhesive typically ranges from about 1 mil (25 micrometers) to about 30 mil (762 micrometers). Preferably, the adhesive forms a layer with sufficient adhesion between the adhesive article and the gypsum board. The time required for the adhesion to develop may vary due to humidity and/or ambient temperature.

Because the adhesive articles of the present disclosure can be used for finishing work in construction, it is advantageous for the outwardly-facing surface of the adhesive article to sufficiently adhere sheetrock mud. Sheetrock mud (also known as joint compound, drywall compound or Mastic) is typically a mixture of gypsum dust and water which is used to create a seamless surface before painting interior walls.

The adhesive articles of the present disclosure have a second major surface which has a surface free energy of at least 29, 31, 34, or even 38 mN/m. For example, in FIG. 3, the opposing second major surface of the adhesive article is represented by the number 37. The opposing second surface of the adhesive article may be formed by the substrate or may be formed by a coating layer which has a higher surface free energy. The surface free energy is a measure of the force between two materials. In the present disclosure it has been discovered that adhesive articles having a surface free energy at least 29, 31, 34, or even 38 mN/m have an improved adhesion to sheetrock mud than surfaces having a lower surface free energy. Surface free energy can be determined by via contact angle measurements using a variety of reference liquids or Dyne Test marker pens. Materials that have surface free energy higher than 30 mN/m include, polyolefins, polyesters, ethylene vinyl acetate, polyimides, and polyamides. Generally, materials such as silicones and fluoropolymers have lower surface free energy, often these materials are used to create the releaseable surface of a release liner, or are used to coat the backside (opposite the adhesive side) of a tape in a roll of tape such that the tape does not stick to itself. Thus, in one embodiment, the second major surface of the adhesive article is substantially free (i.e., the surface comprises less than 15, 10, 5 or even 1% by area) of silicone and fluoropolymers. Such low free energy surfaces can impact the adherence of the sheetrock mud to the adhesive article when doing finishing of the wall.

In one embodiment, the adhesive article can be used in a roll format, sheet, or a die cut shape. The adhesive article can be used with extended lengths. In one embodiment, the extended lengths are at least 1, 5, 8, or even 10 meters. In one embodiment, the adhesive article may be provided in small pre-cut units.

In one embodiment, the adhesive article of the present disclosure comprises a liner, which is removed from the adhesive side of the adhesive article prior to application to the structural element(s). A liner is a temporary support that is not intended for final use of the adhesive article and is used during the manufacture or storage to support and/or protect the adhesive article. A liner is removed from the adhesive article prior to use. Such liners are known in the art.

To facilitate easy removal from the adhesive layer, the liner comprises a release agent. Such release agents are known in the art and are described, for example in "Handbook of Pressure Sensitive Adhesive Technology," D. Satas, editor, Van Nostrand Reinhold, New York, N.Y., 1989, pp. 585-600. In one embodiment, the release agent migrate to the surface (on the liner) to provide the appropriate release properties.

Examples of release agents include carbamates, silicones and fluorocarbons. Preferred release agents are carbamates having relatively high softening points. Carbamates having long side chains have relatively high softening points and thus are particularly suitable in the present disclosure. A particularly preferred release agent for use in the present disclosure is polyvinyl octadecyl carbamate, available from Anderson Development Co. of Adrian, Mich., marketed as ESCOAT P20, and from Mayzo Inc. of Norcross, Ga., marketed in various grades as RA-95H, RA-95HS, RA-155 and RA-585S.

Illustrative examples of surface applied (i.e., topical) release agents include polyvinyl carbamates such as disclosed in U.S. Pat. No. 2,532,011 (Dahlquist et al.), reactive silicones, fluorochemical polymers, epoxysilicones such as are disclosed in U.S. Pat. No. 4,313,988 (Bany et al.) and U.S. Pat. No. 4,482,687 (Kessel et al.), polyorganosiloxane-polyurea block copolymers such as are disclosed in European Appln. No. 250,248 (Leir et al.), etc.

The adhesive articles of the present disclosure can be applied to seams between gypsum board panels to contain and/or slow the spread of fire.

In one embodiment, the adhesive articles of the present disclosure are used to treat a static joint. A joint system comprises a first structural element having a first attachment area and a second structural element having a second attachment area, the first and second attachment areas defining a space therebetween, the space having a fixed length and width. The adhesive article of the present disclosure is positioned such that the adhesive article is placed over the space and the adhesive layer is fixedly attached to the first attachment area and the second attachment area.

In one embodiment of the present disclosure, the gypsum board assembly (e.g., first and second structural elements and the adhesive article of the present disclosure) is fire-resistant. Where fire-resistant means that the assembly can, for a period of time, withstand the heat intensity (under conditions of a fire) and not structurally fail or allow the cold side of the joint to become hotter than a given temperature (e.g., about 200° C.). In one embodiment, the gypsum board assembly passes a fire-rating test such that the joint system meets the desired fire-rating.

In one embodiment, the fire-resistant joint system is a fire-rated joint system, which passes an approved regiment of testing. Such tests include: ASTM E119-18 "Standard Test Methods for Fire Tests of Building Construction and Materials"; and CAN/ULC S10107 "Standard Methods of Fire Endurance Tests of Building Construction and Materials". These test standards are very similar to NFPA 251, UL 263, ISO 834, and BS 476.

In one embodiment, when the adhesive article disclosed herein when applied to a gypsum board seam on a wall, the wall is returned to the original fire rating of the gypsum board. In one embodiment, the gypsum board construction assembly passes ASTM E119-18 for 30 minutes, 1 hour, 2 hours or even 4 hours.

To pass an approved fire-resistant test, the gypsum board construction assembly needs to withstand a defined temperature profile (for example, exceeding temperatures greater than 700° C.) for a period of time (as described in the standards). In one embodiment, the joint systems of the present disclosure need to pass a hose stream test, wherein a stream of water at a given pressure and time (as described in the standards) is delivered onto the joint system after a fire endurance test. The joint system is then rated based on the outcome of the tests. For example, if there are no failures at 1 hour following the test methods, the joint system is then rated for 1-hour. In one embodiment, the fire-resistant joint system of the present disclosure withstands the approved regiment of testing for a period of at least 30 minutes, at least 1 hour, at least 2 hours, or even at least 4 hours according to ASTM E119-18.

The adhesive layer should sufficiently overlap the structural elements to maintain contact with the structural elements and maintain a seal over the lifetime of the joint. In one embodiment, the adhesive overlaps the opening by at least 0.25, 0.5, 0.75, 1, 2, or even 4 inches (6.4, 12.7, 19, 25.4, 50.8, or even 101.6 mm) on either side; and at most 6 or even 12 inches (152.4, or even 304.8 mm). In other words, the adhesive contacts the first attachment area by at least 0.25 inches (6.4 mm) and the second attachment area by at least 0.25 inches (6.4 mm). The acceptable overlap of the adhesive with the attachment areas can vary depending, for example, on the nature of the adhesive used (e.g., the 90 degree peel strength as mentioned above).

Common practice for sealing the seams disclosed herein is to use "drywall tape" which is a simple sheet of kraft paper absent an adhesive layer, which is adhered to the gypsum board panel and seam via a sheetrock compound or mud. Typically, in such applications, there is a delay between the application of the tape and the overall mud coat. The drywall finishing tape available under the trade designation "FLAME FIGHTER FIRE TAPE" from EZ Taping System, Green Bay, WI, must be primed, for example with an oil based primer prior to finishing with a mud coat. The adhesive articles of the present disclosure would enable the immediate application of sheetrock mud after the application of the tape to the gypsum board.

The adhesive article as disclosed herein has ease of use advantages including: (a) the ability to roll a strip of adhesive article down a wall wherein the adhesive is contained in the adhesive article, (b) applying hand pressure to adhere the adhesive article to the gypsum board, (c) the adhesive article is adhered within seconds of attaching, (d) sheetrock mud can be applied immediately after applying the tape, and/or (e) finishing of the joint may involve less time due to the minimal thickness of the adhesive article. As seen in both FIGS. 1 and 2, the adhesive article is attached to the outer surface of the wall (or ceiling) and the adhesive article maintains a distance from the outer surface of the wall which is nominally the thickness of the adhesive article. Typical thickness of the adhesive articles of the present disclosure have a thickness of at least 50, 75, 100, or even 150 micrometers; and at most 200, 400, 600, 800, 1000, 1200, or even 1400 micrometers. Advantageously, if the joints disclosed herein occur on a visible wall, the feathering of the joint (to create an uninterrupted surface between the two gypsum board panels) can be minimized due to the thinness of the adhesive article as compared to other systems of providing fire-resistance to joints.

In one embodiment, the adhesive articles of the present disclosure can be used in Level 2 finishing work, where the joints are taped with the adhesive articles disclosed herein and a thin coat of sheetrock mud is applied over the joints and angles. Such a finishing level is conducted in unfinished areas such as garages and storage areas. In one embodiment, the adhesive articles of the present disclosure can be used in Level 3 finishing work, where the joints are taped with the adhesive articles disclosed herein and a thin coat of sheetrock mud is applied over the joints and angles as in Level 2 and an additional coat of sheetrock mud is applied over the taped joints and angles. Such a finishing level is conducted in finished areas which will have a medium to heavy final paint texture or heavyweight wall covering and no tool marks or ridges. In one embodiment, the adhesive articles of the present disclosure can be used in Level 4 finishing work, where the joints are taped with the adhesive articles disclosed herein and a thin coat of sheetrock mud is applied over the joints and angles as in Level 2 and two additional coats of sheetrock mud are applied over the taped joints and angles and a primer coat is applied to the gypsum board. In Level 4, the mud has to be smooth with no tool marks. Such a finishing level is conducted in finished areas which will have a light final paint texture, flat paint, or lightweight wall covering. In one embodiment, the adhesive articles of the present disclosure can be used in Level 5 finishing work, which is done for walls that will be painted with flat paint, enamel, semi-gloss, and gloss paint. In Level 5 finishing work, the joints are taped with the adhesive articles disclosed herein and a thin coat of sheetrock mud is applied over the joints and angles as in Level 2 and two additional coats of sheetrock mud are applied over the taped joints and angles and a thin skim coat of sheetrock mud is applied over the entire surface of the wall and then a primer is applied.

The system of the present disclosure is rated for protection of the "cold side" of the structure (e.g., wall). In other words, the side of the wall away from the fire. Since, one cannot predict which side of the wall a fire will occur, in practical use, the adhesive article of the present disclosure can be used on both sides of a wall. Although not wanting to be limited by theory, it is believed that the adhesive article acts as a barrier minimizing a stack effect (i.e., movement of air resulting from pressure, and/or temperature differences). These stack effects can lead to potential spreading of combustion products (e.g., flame, and/or hot gases including smoke, and heat) from one area to another throughout the building.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Missouri, or may be synthesized by conventional methods.

These abbreviations are used in the following examples: kPa=kilopascals, psi=pounds per square inch, mm=millimeter, sec=second, oz/in =ounce per inch, and mN/m=milliNewton per meter.

Substrate

| Designation | Description |
|---|---|
| A | A drywall finishing tape commercially available under the trade designation "Flame Fighter Fire Tape" from EZ Taping System, Green Bay, WI, a 0.26 mm thick (at maximum), multilayered tape, having an exposed outer surface treated with silicone. |
| B | A silicone release liner, comprising a high density polyethylene substrate and a 1750 polydimethyl silicon release coating sold as HDPE 1750 by Huhtamaki, Espoo, Finland |
| C | A 1.37 mil (34.8 micrometer) biaxially oriented polypropylene (BOPP) film which is commercially available as BA35 from Interplast Group, Ltd., Livingston, NJ |
| D | A 4.5 mil (110 micrometer) thick polyethylene-coated kraft paper commercially available as "PCK Y30011 Brown" from Felix Scholler, Osnabruck, Germany |
| E | A 3.1 mil (79 micrometer) polyethylene film commercially available as "PE Y89010" from Felix Scholler, Osnabruck, Germany |
| F | A 2 mil (50.8 micrometer) polyethylene terephthalate (PET) film commercially available under the trade designation "Hostaphan 3915" from Mitsubishi Polyester Film, Greer, SC |
| G | A 5 mil (127 micrometer) layer of a pressure sensitive acrylic adhesive disposed on Substrate F |

Sample Preparation

A 6 inch (152 mm) length of Substrate A was adhered to a 1 foot-(305 mm-) tall piece of gypsum board available under the trade designation "USG SHEETROCK BRAND FIRECODE X PANELS" from United States Gypsum Co., Chicago, IL.

For each of Substrates B-F, a 6 inch (152 mm) long and 3 inch (76 mm) wide piece of the substrate was positioned onto a 1 foot-(305 mm-) tall piece of gypsum board (TYPE)

and adhered to the gypsum board using masking tape (available under the trade designation "3M SCOTCH 232 HIGH PERFORMANCE MASKING TAPE", 3M Co., Maplewood, MN) applied to all four-edges of the strips. For Substrates B and D, the coated side of the piece was positioned away from the gypsum board.

Mud (commercially available under the trade designation "USG Sheetrock Brand All Purpose Joint Compound" from USG Corp., Chicago, IL) was applied to the surface of Substrates A-F, overlapping onto the gypsum board. The mud was allowed to dry for 24 hours. The final thickness of the mud was about 0.5 mm.

Peel Test

A 20 mm aluminum dolly (DeFelsko, Ogdensburg, NY) was adhered to the sample using a double-sided tape (available under the trade designation "3M Adhesive Transfer Tape 463" from 3M Co., Maplewood, MN). The aluminum dolly was positioned on top of the dried mud approximately in the center of the underlying Substrate. Using a PosiTEST AT-A Pull-off Adhesion Tester (DeFelsko, Ogdensburg, NY), the aluminum dolly was pulled at a 30 psi/see (207 kPa/sec) and the adhesion was determined for each sample. Shown in Table 1 below is the average pressure exerted to remove the aluminum dolly from at least three samples. Also shown in Table 1 is the % removal, which described the average diameter of the dried mud separated from the underlying Substrate and removed during the testing of at least three replicates, wherein 100% removal is an average 20 mm diameter circle and a 200% removal is an average 40 mm diameter circle.

Shown in Table 1 below are the results from the Peel Test for each of the Substrates along with the material at the surface of the Substrate, in contact with the mud. Also shown in Table 1, is the surface free energy value for each of surface materials, which were taken from "Polymer Handbook", 4$^{th}$ Edition, Brandrup et al., ed., John Wiley & Sons, Inc. New York, 1999, pages VI-524 to VI-540". As shown in Table 1, as the free energy of the surface increases, the removal pressure increases and the % removal of the dried mud decreases.

TABLE 1

| Sample | Substrate | Surface Material | Surface Free Energy, mN/m | Pressure, psi (kPa) | % removal |
|---|---|---|---|---|---|
| Comp. Ex A | A | silicone | 19-22 | 15 +/− 2 (103 +/− 14) | 190% |
| Comp. Ex. B | B | silicone | 19-22 | 15 +/− 1 (103 +/− 7) | 220% |
| Ex. 1 | C | polypropylene | 29-30 | 18 +/− 1 (124 +/− 7) | 110% |
| Ex. 2 | D | polyethylene | 33-37 | 21 +/− 2 (145 +/− 14) | 80% |
| Ex. 3 | E | polyethylene | 33-37 | 24 +/− 4 (166 +/− 28) | 80% |
| Ex. 4 | F | PET | 44-49 | 22 +/− 2 (152 +/− 14) | 75% |

Peel Adhesion

Samples A and G were tested for peel adhesion on gypsum board according to ASTM D3330/D3330M-04 (2010), Test Method F. Sample A had a peel adhesion of 34 oz/in (37 N/10 mm). Sample G had a peel adhesion of greater than 50 oz/in (54 N/10 mm) and removed the paper from the gypsum board when removed.

Foreseeable modifications and alterations of this invention will be apparent to those skilled in the art without departing from the scope and spirit of this invention. This invention should not be restricted to the embodiments that are set forth in this application for illustrative purposes. To the extent that there is any conflict or discrepancy between this specification as written and the disclosure in any document mentioned or incorporated by reference herein, this specification as written will prevail.

What is claimed is:

1. Method of using an adhesive article on a gypsum board construction assembly, the gypsum board construction assembly having a first gypsum board unit and a second gypsum board unit defining a space therebetween, the method comprising:

obtaining the adhesive article, wherein the adhesive article comprises a first major surface and an opposing second major surface, wherein an adhesive is disposed on the first major surface and the opposing second major surface is a polymeric film that has a surface free energy of at least 29 mN/m, and wherein the adhesive article has an adhesion to gypsum board of at least 45 oz/in (0.49 N/mm) as measured by ASTM D3330/D3330M-04 (2010), Test Method F; and fixedly attaching the adhesive article via the adhesive to a first and second attachment areas, wherein the first gypsum board unit comprises an outer paper surface and the second gypsum board unit comprises an outer paper surface and the first attachment area is on the outer paper surface of the first gypsum board unit and the second attachment area is on the outer paper surface of the second gypsum board unit, and wherein a central portion of the adhesive article disposed over the space is non-porous and non-perforated, and wherein the central portion is between at least two opposing distal portions of the adhesive article that comprise perforations.

2. The method of claim 1, wherein the second major surface of the adhesive article comprises at least one of a polyolefin, and a polyester.

3. The method of claim 1, wherein the second major surface of the adhesive article comprises at least one of a polyethylene, polypropylene, polyethylene terephthalate, polyamide and polyimide.

4. The method of claim 1, wherein the space has a nominal width of less than 3.1 mm.

5. The method of claim 1, further comprising disposing sheetrock mud over the second major surface of the adhesive article.

6. The method of claim 1, wherein the first major surface of the adhesive article comprises the perforations.

7. The method of claim 1, wherein the adhesive is selected from at least one of an epoxy, an acrylic, a urethane, a silicone, and a rubber.

8. The method of claim 1, wherein the adhesive is a pressure sensitive adhesive.

9. The method of claim 1, wherein the adhesive comprises at least one of (i) an acrylic adhesive and (ii) a styrene block copolymer and a tackifier.

10. The method of claim 1, wherein the adhesive article comprises a liner adhered to the first major surface, which is removed from the adhesive prior to fixedly attaching to the first and second attachment areas.

11. The method of claim 1, wherein the space is not packed with a high-temperature resistant material.

12. The method of claim 1, wherein the space has a width of at most 2.5 mm.

13. The method of claim 1, wherein the adhesive article has a Gurley value of greater than 40 Gurley seconds.

14. The method of claim 1, wherein the gypsum board construction assembly passes ASTM E119-18 for 2 hours.

15. The method of claim 1, wherein sheetrock mud is applied to the adhesive article immediately after fixedly attaching the adhesive article to the first and second attachment areas.

16. The method of claim 1, wherein the adhesive article comprises a liner adhered to the first major surface and wherein the liner is free of silicone and fluoropolymers.

17. The method of claim 1, wherein the second major surface of the adhesive article comprises at least one of a polyethylene terephthalate, polyamide and polyimide.

* * * * *